(12) United States Patent
Yagi et al.

(10) Patent No.: US 9,638,980 B2
(45) Date of Patent: May 2, 2017

(54) MODULATOR AND PRODUCTION METHOD THEREOF

(71) Applicant: SUMITOMO ELECTRIC INDUSTRIES, LTD., Osaka (JP)

(72) Inventors: Hideki Yagi, Machida (JP); Hirohiko Kobayashi, Machida (JP); Naoya Kono, Yokohama (JP); Takamitsu Kitamura, Fujisawa (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/805,142

(22) Filed: Jul. 21, 2015

(65) Prior Publication Data

US 2016/0026063 A1 Jan. 28, 2016

(30) Foreign Application Priority Data

Jul. 23, 2014 (JP) .................................. 2014-150163

(51) Int. Cl.
*G02F 1/225* (2006.01)
*G02F 1/025* (2006.01)
*G02F 1/21* (2006.01)

(52) U.S. Cl.
CPC ............ *G02F 1/2255* (2013.01); *G02F 1/025* (2013.01); *G02F 2001/212* (2013.01); *G02F 2201/12* (2013.01)

(58) Field of Classification Search
None
See application file for complete search history.

(56) References Cited

U.S. PATENT DOCUMENTS

| | | | | |
|---|---|---|---|---|
| 2003/0190107 A1* | 10/2003 | Walker | .................. | G02F 1/0123 385/2 |
| 2010/0195953 A1* | 8/2010 | Miyatake | .............. | G02F 1/0316 385/14 |
| 2012/0134619 A1* | 5/2012 | Seki | ...................... | G02F 1/0123 385/3 |
| 2013/0136388 A1* | 5/2013 | Uesaka | ................... | G02F 1/225 385/3 |
| 2014/0355926 A1* | 12/2014 | Velthaus | .............. | G02F 1/2255 385/3 |
| 2015/0043865 A1* | 2/2015 | Velthaus | ............... | G02F 1/2255 385/3 |

(Continued)

OTHER PUBLICATIONS

Tauke-Pedretti, A. et al.,40-Gb/s Series-Push-Pull Mach-Zehnder Transmitter on a Dual-Quantum-Well Integration Platform, *IEEE Phototonics Tech. Letters*, vol. 18, No. 18, Sep. 15, 2006.

*Primary Examiner* — Jerry Rahll
(74) *Attorney, Agent, or Firm* — Smith, Gambrell & Russell, LLP.

(57) ABSTRACT

A modulator including: a Mach-Zehnder modulator that includes an optical waveguide disposed on a substrate, the optical waveguide including an electrode thereon; a resin layer disposed on the substrate, the resin layer embedding the optical waveguide, the resin layer having a groove arranged besides the optical waveguide; a termination resistor disposed on the substrate in the groove of the resin layer; and a first wiring disposed on the resin layer, the first wiring being connected to the termination resistor and the electrode of the optical waveguide.

7 Claims, 11 Drawing Sheets

(56) References Cited

U.S. PATENT DOCUMENTS

| | | | |
|---|---|---|---|
| 2015/0378238 A1* | 12/2015 | Matsumoto | G02F 1/2255 385/2 |
| 2016/0011439 A1* | 1/2016 | Kitamura | G02F 1/218 385/2 |
| 2016/0026064 A1* | 1/2016 | Masuyama | G02F 1/025 385/2 |

* cited by examiner

MODULATOR AND PRODUCTION METHOD THEREOF

BACKGROUND OF THE INVENTION

1. Field of the Invention

The present invention relates to a modulator and a production method thereof.

2. Description of the Related Art

A non-patent document (Anna Taube-Pedretti et al., "40-Gb/s Series-Push-Pull Mach-Zehnder Transmitter on a Dual-Quantum-Well Integration Platform", IEEE PHOTONICS TECHNOLOGY LETTERS, VOL. 18, NO, 18, Sep. 15, 2006) discloses an optical device which is a device monolithically integrating a sampled-grating distributed Bragg reflector (SGDBR) laser and a Mach-Zehnder modulator monolithically integrated with an termination resistor. A traveling wave electrode of the Mach-Zehnder modulator is disposed on a photo-bis-benzocyclobutene (BCB) resin. The integrated resistor is disposed on the resin to provide on chip termination.

SUMMARY OF THE INVENTION

However, mounting a termination resistor on a resin may cause a shift of characteristics of the termination resistor from a designed value. The surface of the resin is likely to have height difference, and the characteristics of the termination resistor varies due to the height difference of the surface. It is difficult to integrate the termination resistors having uniform characteristics monolithically with the Mach-Zehnder modulators.

An aspect of the present invention provides a modulator that includes a Mach-Zehnder modulator including an optical waveguide disposed on a substrate, the optical waveguide including an electrode thereon; a resin layer disposed on the substrate, the resin layer embedding the optical waveguide, the resin layer having a groove arranged besides the optical waveguide; a termination resistor disposed on the substrate in the groove; and a first wiring disposed on the resin layer, the first wiring being connected to the termination resistor and the electrode of the optical waveguide.

Another aspect of the present invention provides a method for producing a modulator, the method including the steps of: forming an optical waveguide on a substrate; forming a first resin layer on the substrate, the first resin layer embedding the optical waveguide; forming a groove in the first resin layer, the groove having a bottom surface on the substrate; forming an electrode on the optical waveguide, the electrode being in contact with an upper surface of the optical waveguide through an opening formed in the first resin layer; forming a termination resistor on the bottom surface of the groove; and forming a wiring on the first resin layer, the wiring being connected to the termination resistor in the groove and the electrode of the optical waveguide.

DESCRIPTION OF THE PREFERRED EMBODIMENTS

Specific examples of a modulator and a production method thereof according to embodiments of the present invention will now be described with reference to drawings.

Comparative Example

Figure 1:
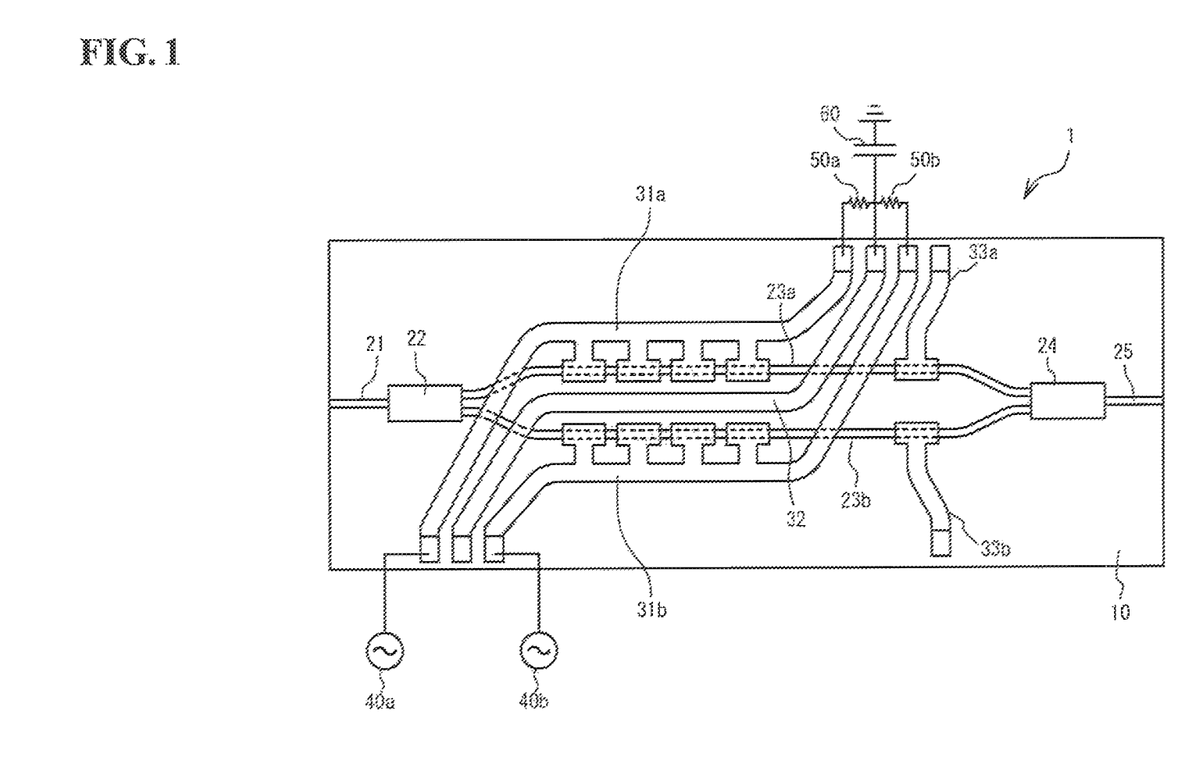
FIG. 1 is a schematic top view of a modulator according to a comparative example.

FIG. 1 is a schematic top view of a modulator 1 according to a comparative example. As illustrated in FIG. 1, the modulator 1 is a semiconductor chip that includes a substrate 10 and a Mach-Zehnder modulator formed on the substrate 10. The Mach-Zehnder modulator includes a combination of optical waveguides 21, 22, 23a, 23b, 24 and 25. External resistors 50a and 50b are disposed outside the substrate 10. Signal wirings 31a and 31b are disposed on the substrate 10. The wirings 31a, and 31b are connected to the external resistors 50a and 50b disposed outside the substrate 10 via bonding wires. According to this configuration, deterioration of high-frequency electrical signals occurs in the bonding wires.

Embodiment

Figure 2:
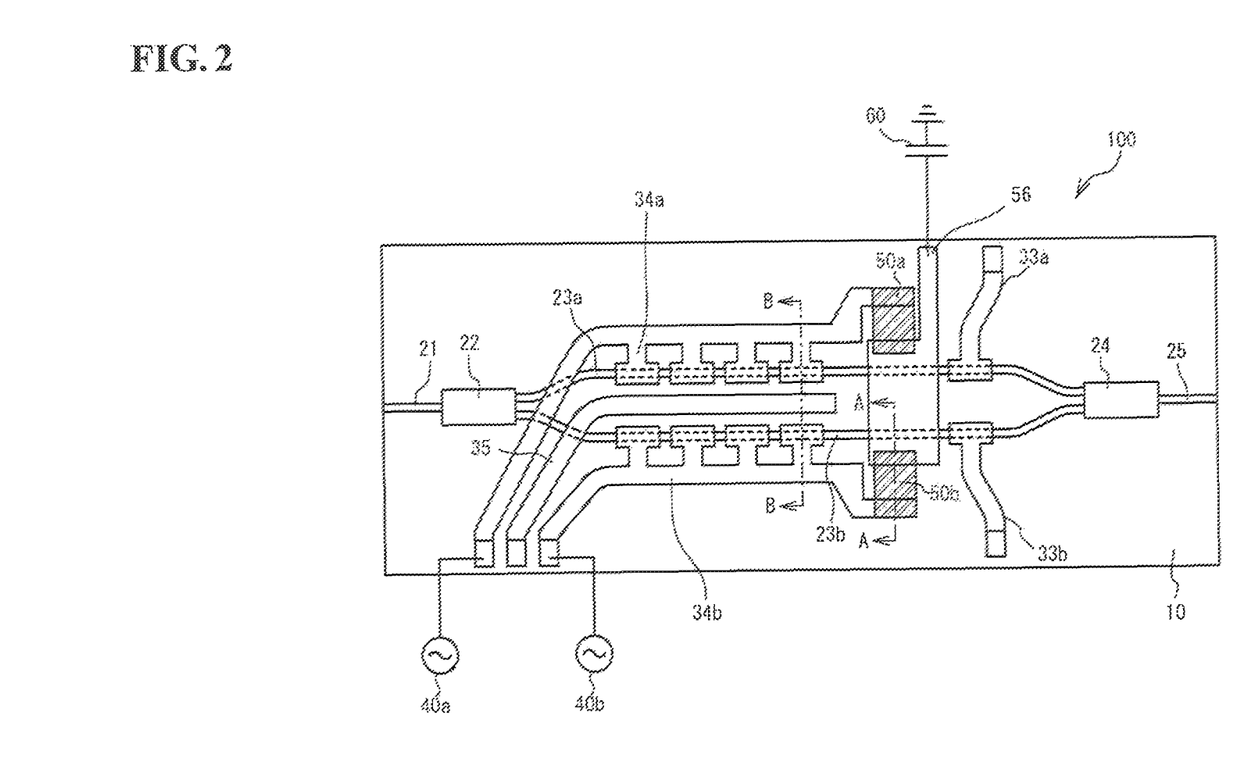
FIG. 2 is a schematic top view of a modulator according to an embodiment.

FIG. 2 is a schematic top view of a modulator 100 according to an embodiment. As illustrated in FIG. 2, the modulator 100 is a semiconductor chip that includes a substrate 10 and a Mach-Zehnder modulator formed on the substrate 10. The Mach-Zehnder modulator includes a combination of optical waveguides 21, 22, 23a, 23b, 24 and 25. Each optical waveguide has a mesa-shape. The optical waveguides of the Mach-Zehnder modulator consist of an input waveguide 21, optical couplers 22 and 24, two arm waveguides 23a and 23b, and an output waveguide 25. The optical coupler 22 splits a light beam input from the input waveguide 21. The two arm waveguides 23a and 23b propagate light beams from the optical coupler 22. The optical coupler 24 combines the light beams that have propagated through the arm waveguides 23a and 23b. The output waveguide 25 guides the light beam output from the optical coupler 24 to an external unit. The arm waveguide 23a has a segmented electrode thereon, and the arm waveguide 23b has a segmented electrode thereon.

A resin layer is disposed on the substrate 10. The resin layer covers a surface of the substrate 10, and the resin layer embeds the optical waveguides of the Mach-Zehnder modulator. The resin layer has grooves formed therein. A termination resistor 50a is disposed on the substrate in one groove. A termination resistor 50b is disposed on the substrate in another groove.

Metal wirings 33a, 33b, 34a, 34b, 35 and 56 are disposed on the resin layer. A signal wiring 34a is arranged besides the arm waveguide 23a. The resin layer has first openings on the arm waveguides 23a, and the signal wiring 34a is connected to the segmented electrode of the arm waveguide 23a through the openings. One end of the signal wiring 34a is connected to a first end of the termination resistor 50a in the groove. The other end of the signal wiring 34a extends to a vicinity of a side edge of the substrate 10. An external signal source 40a is connected to the signal wiring 34a via a bonding wire. A signal wiring 34b is arranged besides the arm waveguide 23b. The resin layer has first openings on the arm waveguides 23b, and the signal wiring 34b is connected to the segmented electrode of the arm waveguide 23b through the openings. One end of the signal wiring 34b is connected to a first end of the termination resistor 50b in the groove. The other end of the signal wiring 34b extends to a vicinity of a side edge of the substrate 10, and is connected to an external signal source 40b.

A phase adjusting wiring 33a is connected a phase electrode disposed on the arm waveguide 23a. The phase electrode of the arm waveguide 23a is disposed apart from the segmented electrode of the arm waveguide 23a. A phase adjusting wiring 33b is connected a phase electrode disposed on the arm waveguide 23b. The phase electrode of the arm waveguide 23b is disposed apart from the segmented electrode of the arm waveguide 23b. A reference wiring 35 is arranged between the arm waveguide 23a and the arm waveguide 23b. A ground wiring 56 is arranged between the termination resistor 50a and the termination resistor 50b. The ground wiring 56 connects a second end of the termination resistor 50a and a second end of the termination resistor 50b. The ground wiring 56 extends to a vicinity of a side edge of the substrate 10, and is electrically grounded via an external capacitor 60.

A high-frequency electrical signal is input to the wiring 34a from the signal source 40a. A high-frequency electrical signal is input to the wiring 34b from the signal source 40b. The electrical signals are applied to the arm waveguides 23a and 23b through the wirings 34a and 34b. The refractive indices of the arm waveguides 23a and 23b change in accordance with the electrical signal. The phases of the light beams passing through the arm waveguides 23a and 23b. As a result, the light beam output from the output waveguide 25 is turned ON and OFF, and a modulating signal is obtained.

A DC signal is fed to the wiring 33a from an external unit to adjust the phase of the light beam propagating through the arm waveguide 23a. The phase of the light beam propagating through arm waveguide 23b is adjusted by using the wiring 33b in the same manner as the wiring 33a.

Figure 3:
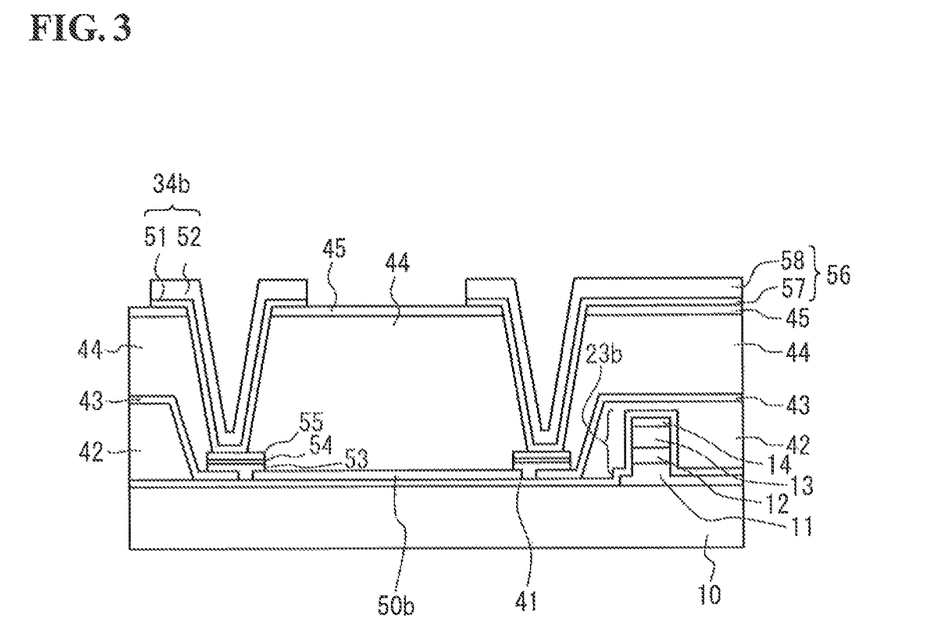
FIG. 3 is a cross-sectional view taken along line A-A in FIG. 2.

FIG. 3 is a cross-sectional view taken along line A-A in FIG. 2. As illustrated in FIG. 3, the resin layer includes a first resin layer 42 and a second resin layer 44. The arm waveguide 23b is embedded in the first resin layer 42. The first resin layer 42 has a groove arranged besides the arm waveguide 23b. The termination resistor 50b is disposed on the substrate 10 in the groove, A first insulating layer 41 is disposed between the termination resistor 50b and the substrate 10. The termination resistor 50b is embedded in the second resin layer 44. A second insulating layer 43 is disposed between the first resin layer 42 and the second resin layer 44. The second insulating layer 43 is in contact with the first insulating layer 41 in the groove of the first resin layer 42. In the groove, an edge of the second insulating layer 43 keeps at a distance from an edge of the termination resistor 50b.

As illustrated in FIG. 3, the second resin layer 44 has second openings on the termination resistor 50b. The second openings have inclined surfaces of the second resin layer 44. The signal wring 34b is disposed on a top surface of the second resin layer 44. The wiring 34b extends on a first inclined surface of the second resin layer 44 from the top surface of the second resin layer 44 toward the bottom of the groove. The wiring 34b is connected to the first end of the termination resistor 50b at the bottom of the groove. More specifically, a connecting part including a Ti/Pt/Au layer 53, a TiW layer 54 and a Au layer 55 is disposed on the first end of the termination resistor 50b. A surface of the connecting part is exposed in the second opening, and the wiring 34 including a TiW layer 51 and a Au layer 52 comes in contact with the surface of the connecting part at a lower end of the first inclined surface of the second resin layer 44. A third insulating layer 45 may be disposed between the TiW layer 51 and the top surface of the second resin layer 44.

The ground wiring 56 is disposed on the top surface of the second resin layer 44. The wiring 56 extends on a second inclined surface of the second resin layer 44 from the top surface of the second resin layer 44 toward the bottom of the groove. The wiring 56 is connected to the second end of the termination resistor 50b at the bottom of the groove. More specifically, a connecting part including a Ti/Pt/Au layer 53, a TiW layer 54 and a Au layer 55 is disposed on the second end of the termination resistor 50b. The wiring 56 including a TiW layer 57 and a Au layer 58 comes in contact with the surface of the connecting part at a lower end of the second inclined surface of the second resin layer 44. The third insulating layer 45 may be disposed between the TiW layer 57 and the top surface of the second resin layer 44.

The termination resistor 50a and the signal wiring 34a are connected in the same manner as described for the termination resistor 50b. The termination resistor 50a and the ground wiring 56 are connected in the same manner as described for the termination resistor 50b.

As illustrated in FIG. 3, the arm waveguide 23b includes a lower cladding layer 11, a core layer 12, an upper cladding layer 13, and a contact layer 14 that are sequentially stacked on the substrate 10 in that order so as to form a mesa shape. The substrate 10 is, for example, a semi-insulating InP substrate. The lower cladding layer 11 is, for example, composed of n-type InP. The core layer 12 is, for example, a multi quantum well (MQW) in which a large number of undoped AlGaInAs well layers and AlGaInAs barrier layers are stacked. The upper cladding layer 13 is, for example, composed of p-type InP. The contact layer 14 is, for example, a p-type GaInAs layer.

The first insulating layer 41 covers the substrate 10 and the arm waveguide 23b. The first resin layer 42, the second insulating layer 43, the second resin layer 44, and the third insulating layer 45 are stacked on the first insulating layer 41 in that order. The first insulating layer 41 is, for example, composed of $SiO_2$. The first resin layer 42 is, for example, composed of a resin such as bis-benzocyclobutene (BCB). The second insulating layer 43 is, for example, composed of $SiO_2$. The second resin layer 44 is, for example, composed of a resin such as BCB. The third insulating layer 45 is, for example, composed of $SiO_2$. The arm waveguide 23a (not shown in FIG. 3) has a similar structure with the arm waveguide 23b. The arm waveguide 23a is also embedded by the first resin layer 42.

The resistor 50b is in contact with and disposed on the first insulating layer 41 in a region where the optical waveguides of the Mach-Zehnder modulator are not formed. Specifically, the resistor 50b is disposed on the substrate 10 with the first insulating layer 41 therebetween. The resistor 50b is located in a groove formed in the first resin layer 42. The resistor 50b is embedded by the second resin layer 44. The resistor 50b is, for example, a NiCrSi thin film. An upper surface of the resistor 50b is covered with the second resin layer 44. The resistor 50a (not shown in FIG. 3) has a similar structure with the resistor 50b.

The wiring 34b has a structure in which the Au layer 52 is stacked on the TiW layer 51. The connecting part on the termination resistor 50b is constituted by the Ti/Pt/Au layer 53, the TiW layer 54, and the Au layer 55 stacked in that order. The wiring 56 has a structure in which the Au 58 is stacked on the TiW layer 57. The TiW layer 51, the TiW layer 54, and the TiW layer 57 are, for example, composed of a titanium tungsten alloy. The Au layer 52, the Au layer 55, and the Au layer 58 are composed of gold. The Ti/Pt/Au layer 53 is, for example, a metal multilayer film in which titanium, platinum, and gold are stacked in that order.

In this embodiment, the resistors 50a and 50b are disposed on the substrate 10 and under the second resin layer 44. In other words, the resistors 50a and 50b are not disposed on the resin layer that has large thickness variation. The resistors 50a and 50b are disposed on the substrate 10 that is more flat than the upper surface of the resin layer. Accordingly, the dimensions of the resistors 50a and 50b are formed accurate. As a result, variation in the resistance values of the resistors 50a and 50b can be decreased. It should be noted that in this embodiment, the resistors 50a and 50b are disposed on the substrate 10 with the first insulating layer 41 therebetween. The flatness of an upper surface of the first insulating layer 41 is higher than that of the resin layer. Accordingly, variation in the resistance values of the resistors 50a and 50b disposed on the first insulating layer 41 is decreased.

If the resistors are disposed on the resin layer, the resistance of the resistors may show large variation. This is because the surface of the resin layer is not flat, resulting the variation of the resistance of the resistors. The surface of the substrate 10 is flatter than the surface of the resin layer. Thus, the resistance of the resistors disposed on the substrate 10 is uniform. The flatness can be quantified by a "difference level of the surface". The difference level of the surface is measured by a stylus-type surface roughness profiler, for example. When the thicknesses of the resistors 50a and 50b are small, the resistors 50a and 50b have large sheet areas. In such a case, the resistors 50a and 50b are preferably disposed on the surface having a small difference level. In this embodiment, the sheet area of the resistors 50a and 50b is 2500 mm$^2$, and resistors are designed to have a resistance of 50 Ω at a thickness of 45 nm. If the resistors are placed on sites where the difference level of the surface is as large as 80 nm, the maximum resistance observed among these resistors is about 150 Ω and thus variation of the resistance is large. In this embodiment, resistors are formed on flat sites where the difference in level of irregularities on the surface is about 8 nm, and the variation in resistance value is ±10% or less.

The second resin layer 44 covers the resistors 50a and 50b. The resin layer on the resistors protects the resistors from a damage. In addition, as the resin layer is disposed on the resistors, heat dissipation from the resistor is smoother compared to when the upper surfaces of the resistors are in contact with air.

As illustrated in FIG. 2, the longitudinal direction of the resistors 50a and 50b is perpendicular to the direction in which the arm waveguides 23a and 23b extend on the substrate 10. According to this structure, the resistors 50a and 50b can be connected to the wiring 56 via the shortest route. The wirings 34a and 34b have portions extending obliquely in a direction away from the arm waveguides 23a and 23b at the ends of the wirings 34a and 34b. Since the ends of the wirings 34a and 34b extend in the oblique direction, the high-frequency signal is prevented from being reflected at the second ends.

As illustrated in FIG. 3, the angle formed between the inclined surface of the second resin layer 44 and the top surface of the second resin layer 44 is preferably 110° or larger. This is because the wiring that extends down the inclined surface is likely to be prevented from disconnection. Deterioration of high-frequency characteristics is also suppressed by this angled side wall of the second opening.

Next, a method for producing a modulator 100 is described. FIGS. 4A to 6B are cross-sectional views illustrating processes of producing a portion where the termination resistors 50a and 50b are formed. First, a stacked semiconductor layers including a lower cladding layer 11, a core layer 12, an upper cladding layer 13, and a contact layer 14 is grown on the substrate 10 by organo-metallic vapor phase epitaxy (OMVPE) method. Then mesas of arm waveguides 23a and 23b are formed on the substrate 10 by dry-etching the stacked semiconductor layers.

Figure 4A:
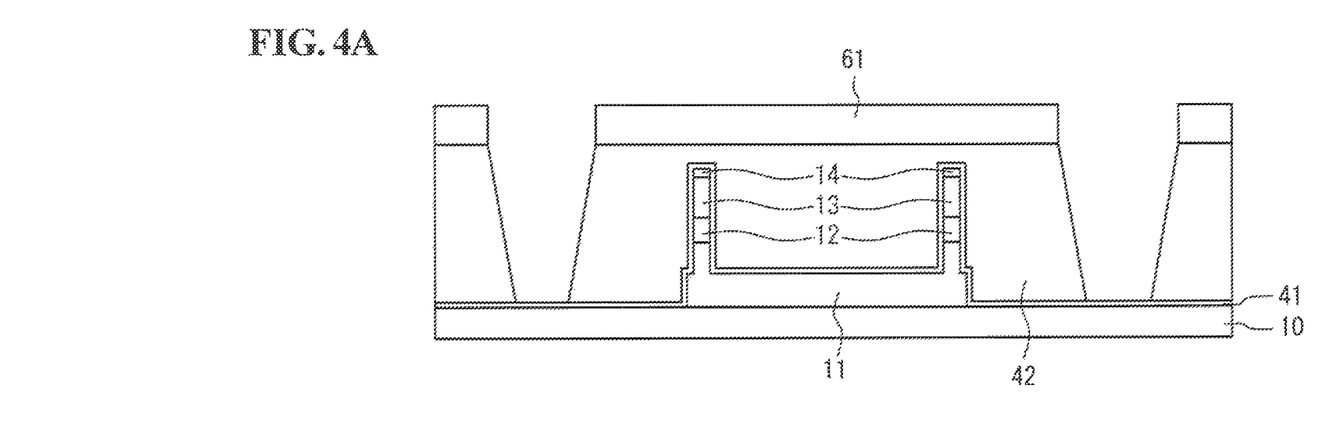
FIGS. 4A and 4B are cross-sectional views illustrating a production process.

Next, SiO$_2$ is deposited to a thickness of about 300 nm by a chemical vapor deposition (CVD) method so that the deposited SiO$_2$ functions as a first insulating layer 41. Then bisbenzocyclobutene (BCB) resin is applied thereto by a spin coating method to form a first resin layer 42. Next, as illustrated in FIG. 4A, grooves are formed in the first resin layer 42 by removing the first resin layer 42. The removal is carried out by forming a resist pattern 61 on the first resin layer 42 by photolithography, and by conducting CF$_4$/O$_2$- reactive ion etching (RIE) using the resist pattern 61 as an etching mask. As a result, the grooves are formed in the first resin layer 42. The grooves are located outside the mesas of the arm waveguides 23a and 23b. The first insulating layer 41 is exposed at the bottoms of the grooves. Then the resist pattern 61 is removed by using an organic solvent.

Figure 4B:
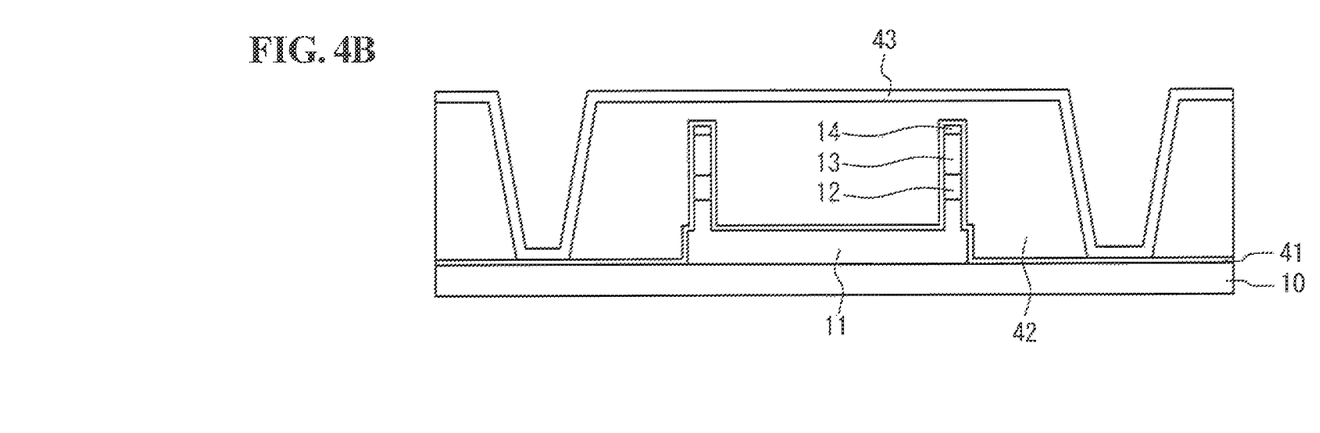

As illustrated in FIG. 4B, a second insulating layer 43 is formed on the first resin layer 42, and on the first insulating layer 41 in the grooves. The second insulating layer 43 is composed of SiO$_2$. The second insulating layer 43 is formed by a sputtering method, a CVD method, or the like. Alternatively, the second insulating layer 43 composed of SiON may be formed by a CVD method or the like. As illustrated in FIG. 4B, two insulating layers, namely, the first insulating layer 41 and the second insulating layer 43 are stacked on the substrate 10 at the bottom of each groove formed in the first resin layer 42.

Figure 5A:
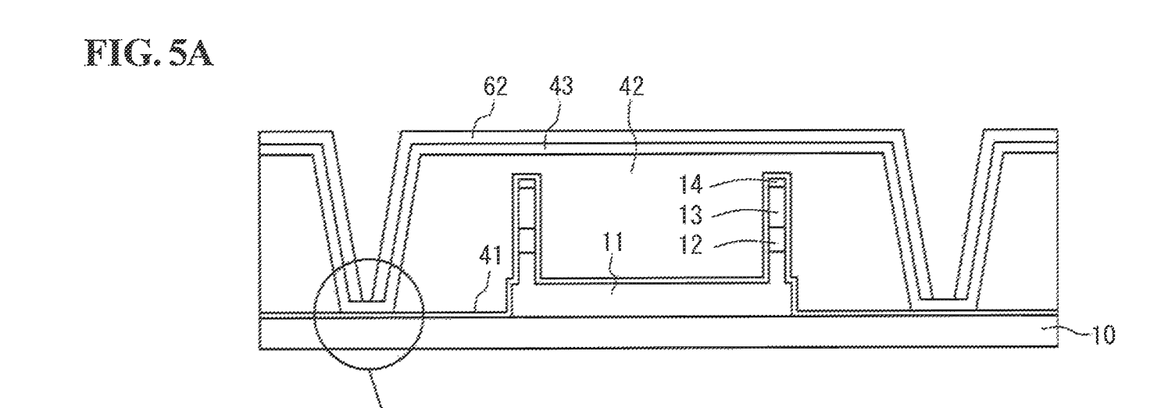
FIGS. 5A to 5C are cross-sectional views illustrating a production process.

Next, as illustrated in FIG. 5A, a resist pattern 62 for forming the termination resistors 50a and 50b is formed on the second insulating layer 43 by a photolithography process. In the photolithography process, the thickness of the resist pattern 62 is preferably greater than 3 μm. The resist pattern 62 has openings in the bottoms of the grooves of the first resin layer 42. The second insulating layer 43 is exposed in the openings of the resist pattern 62. The second insulating layer 43 is then wet-etched by using the resist pattern 62 as a mask. The etchant used in the wet-etching is buffered hydrofluoric acid (BHF). The wet-etching is stopped when the second insulating layer 43 is removed and the first insulating layer 41 is exposed in the opening.

Figure 5B:
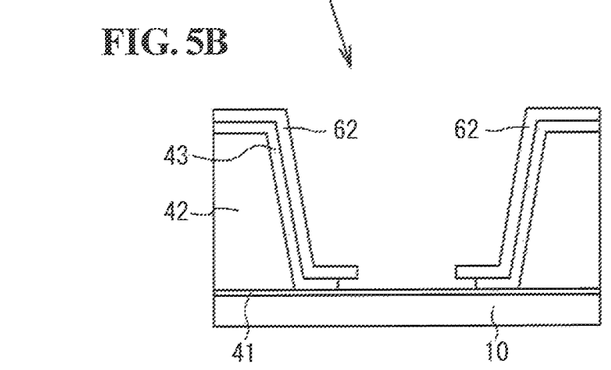

After the wet-etching, as illustrated in FIG. 5B, the second insulating layer 43 is side-etched with respect to an edge of the resist pattern 62. An eaves shape is formed at an end portion of each opening of the resist pattern 62. Specifically, the edge of the resist pattern 62 protrudes from an edge of the second insulating layer 43 on the first insulating layer 41. Since the wet-etching is adopted for the etching of the second insulating layer 43, instead of dry-etching that induces a surface roughness, the exposed surface of the first insulating layer 41 in the grooves maintains its smoothness.

In the case where the first insulating layer 41 is $SiO_2$ formed by CVD and the second insulating layer 43 is $SiO_2$ formed by sputtering, the second insulating layer 43 is etched faster than the first insulating layer 41 with BHF. Accordingly, the side-etch amount of the second insulating layer 43 can be increased substantially while leaving the first insulating layer 41 almost unetched. The eaves shape becomes suitable for lift-off process performed later for forming the resistors 50a and 50b. Similarly, in the case where the first insulating layer 41 is $SiO_2$ formed by CVD and the second insulating layer 43 is SiON formed by CND, the eaves shape suitable for lift-off process is obtained.

Figure 5C:
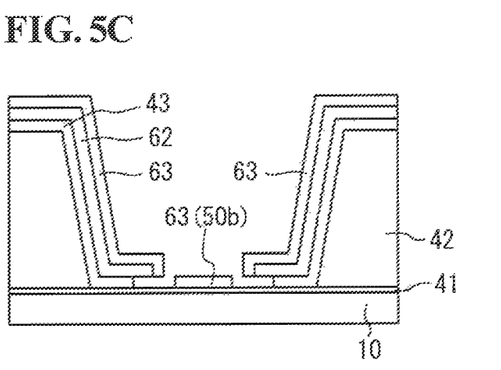

Subsequently, as illustrated in FIG. 5C, a thin film 63 for the resistors 50a and 50b (for example, NiCrSi) is formed by a sputtering method on the exposed surface of the insulating layer 41 and on the resist pattern 62. The resist pattern 62 is then removed by using an organic solvent to conduct lift-off. Since the eaves shape is formed at an end portion of the resist pattern 62, the edges of the resistors 50a and 50b after the lift-off are positioned apart from the edges of the second insulating layer 43. The position of the edges of the resistors 50a and 50b are made accurate owing to the eaves shape of the resist pattern 62. Thus, the resistance values of the resistors 50a and 50b are accurate.

Figure 6A:
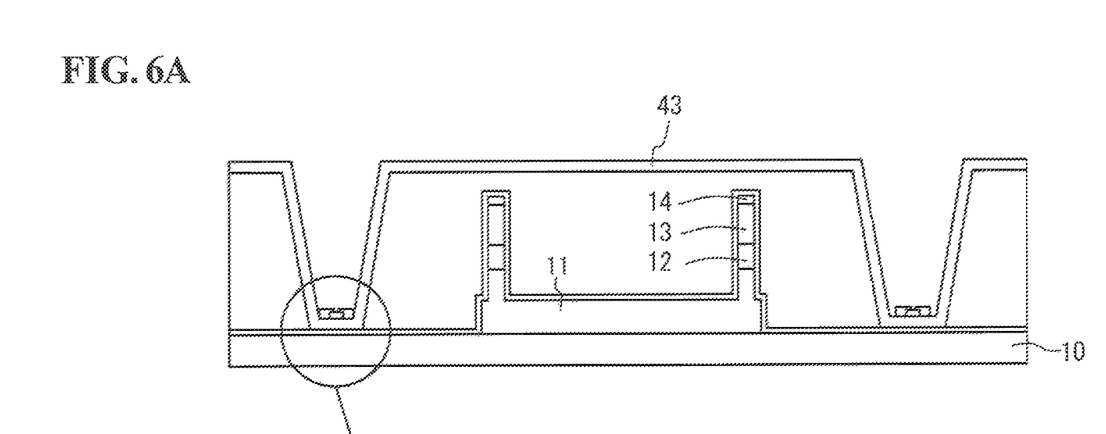
FIGS. 6A and 6B are cross-sectional views illustrating a production process.
Figure 6B:
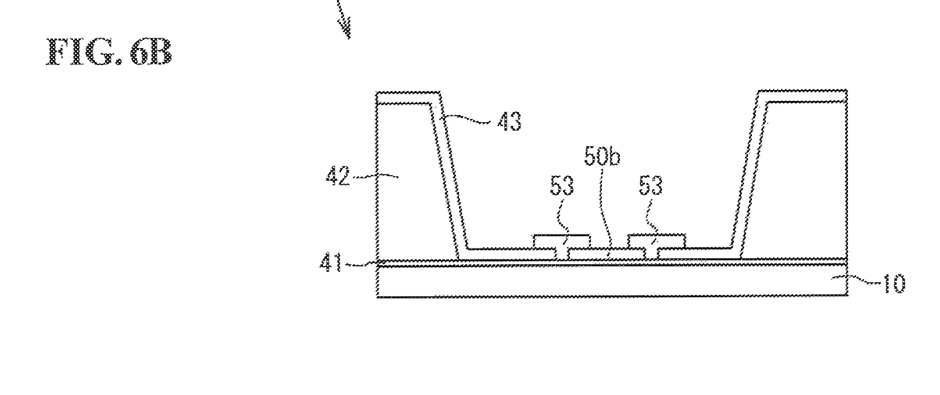

Next, as illustrated in FIGS. 6A and 6B, Ti/Pt/Au layers 53 are formed at both ends of the resistors 50a and 50b by photolithographic patterning, metal evaporation, and lift-off. The Ti/Pt/Au layer 53 is formed so as to cover the edges of the termination resistors 50a and 50b. Then as illustrated in FIG. 7B, a TiW layer 54 is deposited on the Ti/Pt/Au layer 53 by sputtering. A Au layer 55 is formed on the TiW layer 54 by plating method. The layers 53, 54 and 55 constitute connecting parts that connects the wirings and the resistor.

Figure 7A:
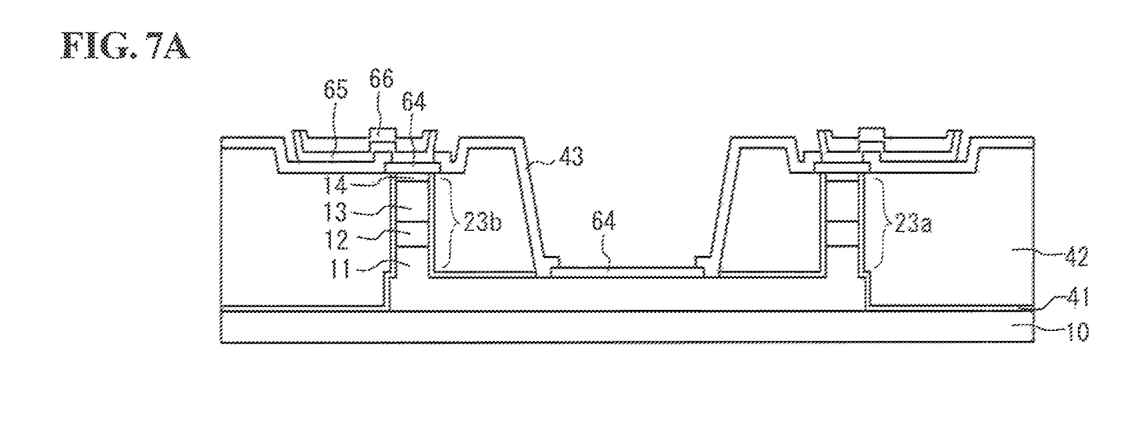
FIGS. 7A and 7B are cross-sectional views illustrating a production process.
Figure 7B:
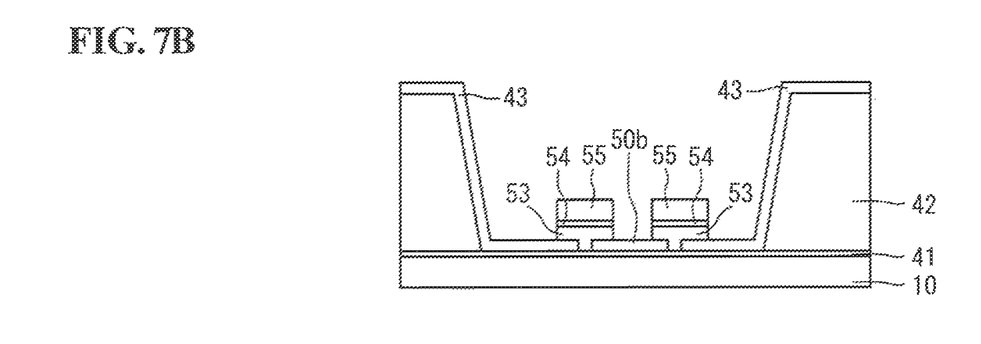

FIG. 7A corresponds to a cross-section taken along line B-B in FIG. 2. FIG. 7A is a cross-section where the arm waveguides 23a and 23b, the signal wirings 34a and 34b, and the reference wiring 35 are to be formed. As illustrated in FIG. 7A, first openings are formed in the first resin layer 42 on the arm waveguides 23a and 23b. The contact layers 14 are exposed in the first openings of the first resin layer 42. A Ti/Pt/Au layer 64 which is in contact with the contact layer 14 is formed in the first openings. The Ti/Pt/Au layers 64 function as segmented electrodes of the arm waveguide 23a and 23b. A TiW layer 65 and a Au layer 66 are formed on the Ti/Pt/Au layer 64 and on the first resin layer 42. The TiW layer 65 and the Au layer 66 are parts of the signal wirings 34a and 34b. The Ti/Pt/Au layer 64 is also formed on the lower cladding layer 11 between the arm waveguide 23a and the arm waveguide 23b. The Ti/Pt/Au layer 64 between the arm waveguides 23a and 23b functions as a part of the reference wiring 35. The Ti/Pt/Au layer 64 is, for example, a metal multilayer film in which titanium, platinum, and gold are stacked in that order. The TiW layer 65 is, for example, composed of a titanium tungsten alloy. The Au layer 66 is composed of gold. The layers 65 and 66 can be formed in the same step of forming the layers 54 and 55 of the connecting parts, and thus the process is simplified.

Figure 8A:
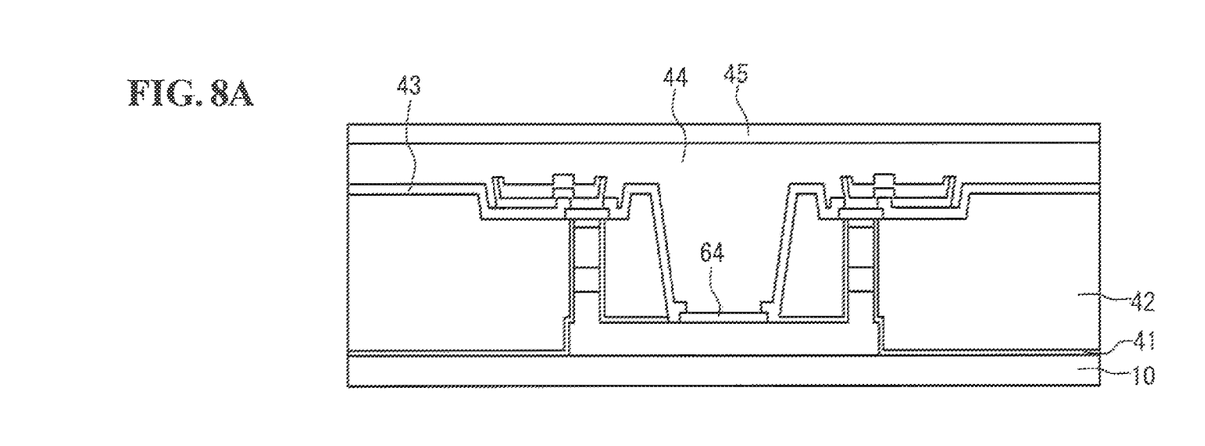
FIGS. 8A and 8B are cross-sectional views illustrating a production process.
Figure 8B:
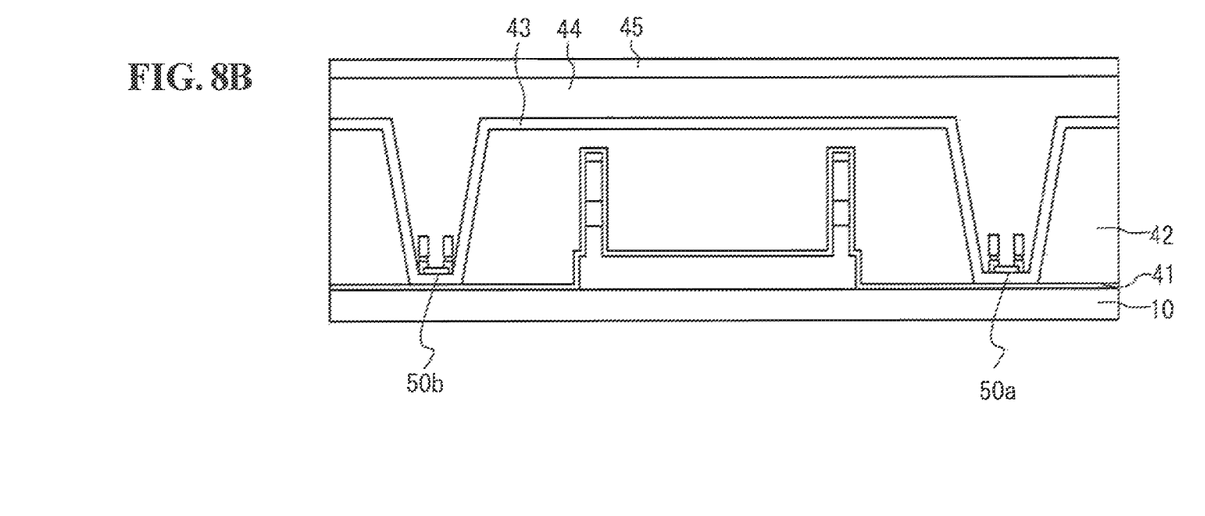

Next, as illustrated in FIGS. 8A and 8B, a second resin layer 44 is formed on the first resin layer 42. FIG. 8A is a cross-section corresponding to FIG. 7A. FIG. 8B illustrates a cross-section where the resistors 50a and 50b are formed outside the arm waveguides 23a and 23b. The second resin layer 44 is formed by as spin-coating method. The second resin layer 44 embeds the resistors 50a and 50b. A third insulating layer 45 having a thickness of about 300 nm is formed on the second resin layer 44 by CVD or a sputtering method.

Figure 9A:
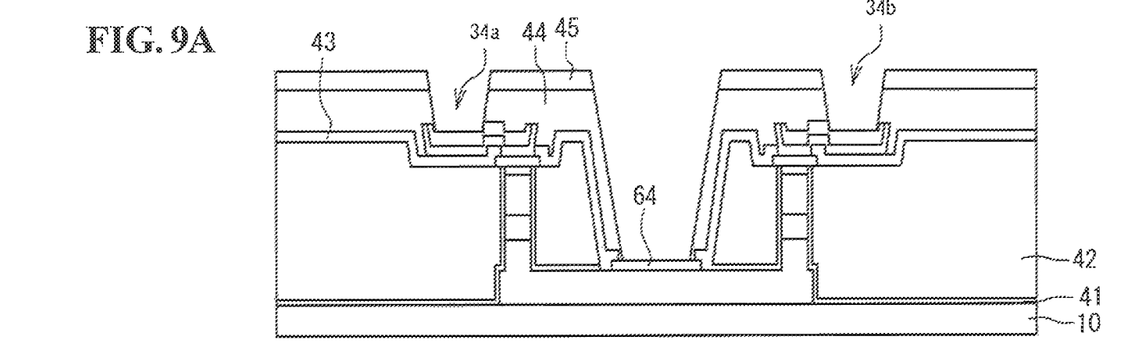
FIGS. 9A and 9B are cross-sectional views illustrating a production process.
Figure 9B:
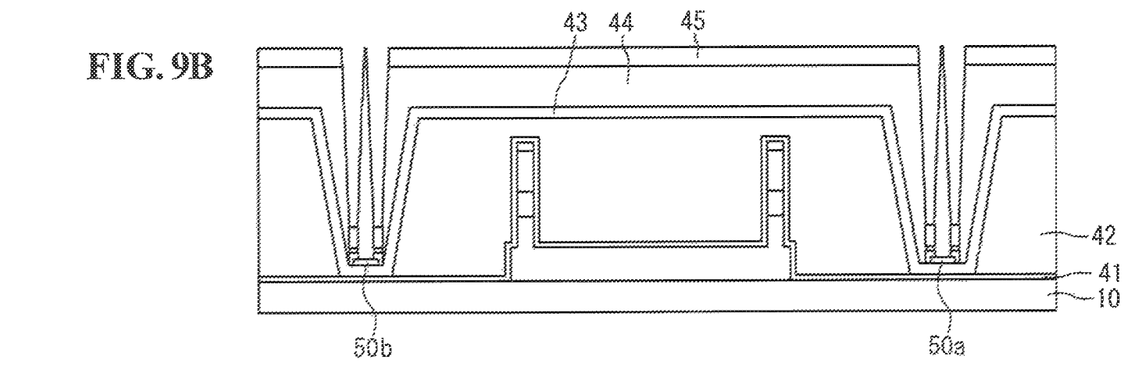

Then, as illustrated in FIGS. 9A and 9B, openings are formed in the second resin layer 44. FIG. 9A is a cross-section corresponding to FIG. 8A. As illustrated in FIG. 9A, openings are formed to expose the surface of the Au layer 66 which constitutes the wirings 34a and 34b. FIG. 9B is a cross-section corresponding to FIG. 8B. As illustrated in FIG. 9B, second openings are formed in the second resin layer 44 on the termination resistors 50a and 50b, The openings are formed by dry-etching the second resin layer 44 using $CF_4/O_2$ gas. The connecting parts on the resistors 50a and 50b are exposed at the bottom of the second openings.

Figure 10A:
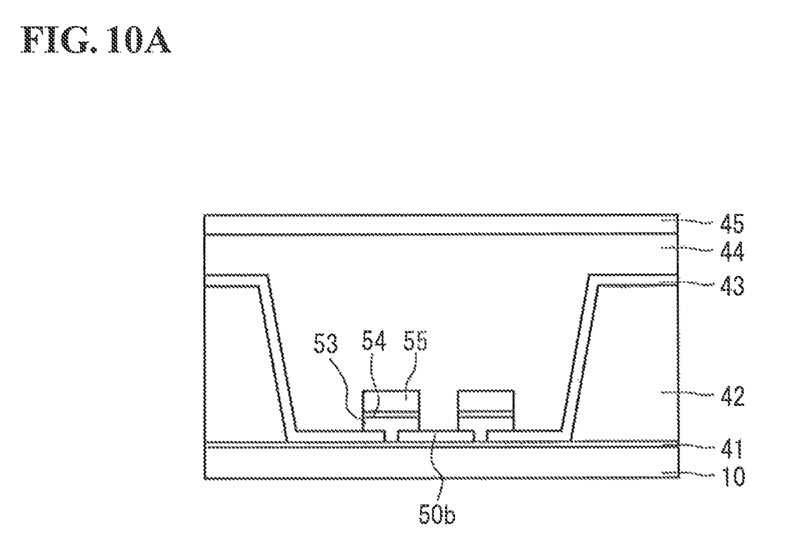
FIGS. 10A and 10B are cross-sectional views illustrating a production process.
Figure 10B:
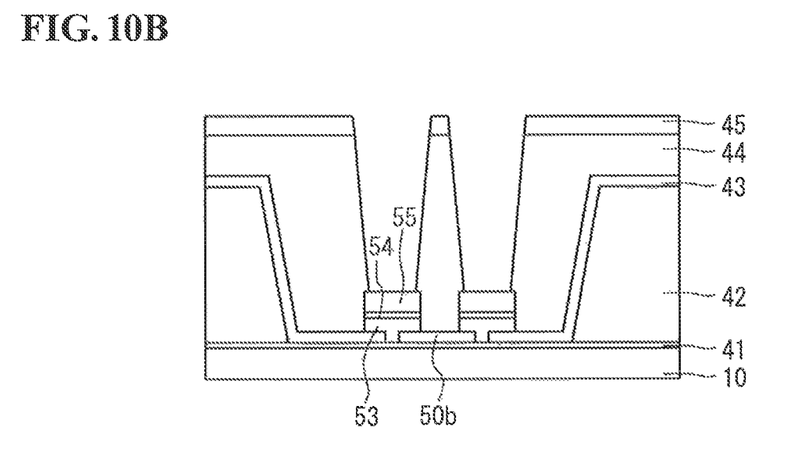

FIG. 10A is an enlarged cross-sectional view of the resistor 50b and its nearby portion before formation of the second opening. FIG. 10B is an enlarged cross-sectional view of the resistor 50b and its nearby portion after formation of the second opening. As illustrated in FIG. 10B, the second openings on the termination resistor 50b have inclined surfaces composed of the second resin layer 44. The inclined surface of the second resin layer 44 extend from a top surface of the second resin layer 44 to the bottom of the second openings.

Figure 11A:
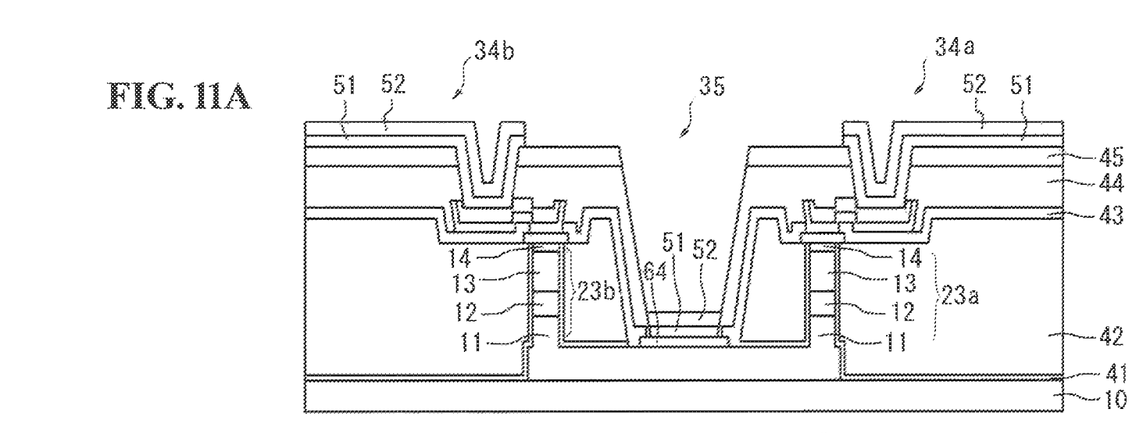
FIGS. 11A and 11B are cross-sectional views illustrating a production process.
Figure 11B:
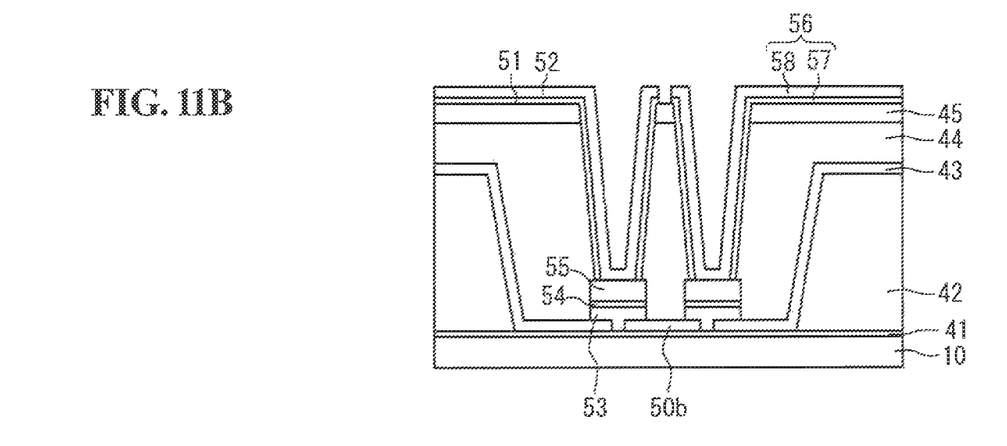

Next, as illustrated in FIG. 11A a TiW layer 51 and a Au layer 52 are formed on the inclined surfaces of the second resin layer 44, on the third insulating layer 45, on the Au layers 66, and on the Ti/Pt/Au layer 64. As illustrated in FIG. 11B, TiW layers 51 and 57 are formed on the inclined surfaces of the second resin layer 44, and on the Au layers 55 of the connecting parts. Au layers 52 and 58 are formed on the TiW layers 51 and 57, respectively. The TiW layers 51 and 57 are deposited by sputtering method. The Au layers 52 and 58 are formed by Au-plating method. FIG. 11A is a cross-section corresponding to FIG. 9A. FIG. 11B is a cross-section corresponding to FIG. 10B. As a result, the signal wirings 34a and 34b, the reference wiring 35, and the ground wiring 56 are formed.

The steps described above are the steps needed to complete production of the modulator 100. According to the method for producing a modulator 100 of the embodiment, termination resistors 50a and 50b are formed on the first insulating layer 41 on the substrate 10 that has relatively high flatness. In such a case, there is no need to form termination resistors 50a and 50h on the resin layer that is likely to have thickness variations. Thus, the dimensional accuracy (accuracy of resistance values) of the resistors 50a and 50b is ensured. As a result, variation in the characteristics of the resistors 50a and 50b can be decreased.

What is claimed is:
1. A modulator comprising:
  a Mach-Zehnder modulator that includes an optical waveguide disposed on a substrate, the optical waveguide including an electrode thereon;
  a resin layer disposed on the substrate, the resin layer embedding the optical waveguide, the resin layer having a groove arranged beside the optical waveguide;
  a termination resistor disposed on the substrate in the groove of the resin layer; and
  a first wiring disposed on the resin layer, the first wiring being connected to the termination resistor and the electrode of the optical waveguide.

2. The modulator according to claim 1, wherein the first wiring extends from a top surface of the resin layer toward a bottom surface of the groove.

3. The modulator according to claim 1, further comprising:
a first insulating layer disposed on the substrate, the first insulating layer being sandwiched between the termination resistor and the substrate.

4. The modulator according to claim 1,
wherein the resin layer embeds the termination resistor.

5. The modulator according to claim 1, further comprising:
a second wiring disposed on the resin layer,
wherein the termination resistor has a first end and a second end opposite to the first end,
the resin layer has a first inclined surface extending from a top surface of the resin layer toward a bottom surface of the groove and a second inclined surface extending from the top surface of the resin layer toward the bottom surface of the groove,
the first wiring is disposed on the first inclined surface and connected to the first end of the termination resistor, and
the second wiring is disposed on the second inclined surface and connected to the second end of the termination resistor.

6. The modulator according to claim 1,
wherein the resin layer includes a first resin layer disposed on the substrate and a second resin layer disposed on the first resin layer,
the first resin layer embeds the optical waveguide, and
the second resin layer embeds the termination resistor.

7. The modulator according to claim 6,
wherein the first resin layer includes an opening on the optical waveguide, and
the first wiring is connected to the electrode of the optical waveguide through the opening.

* * * * *